Figure 1:
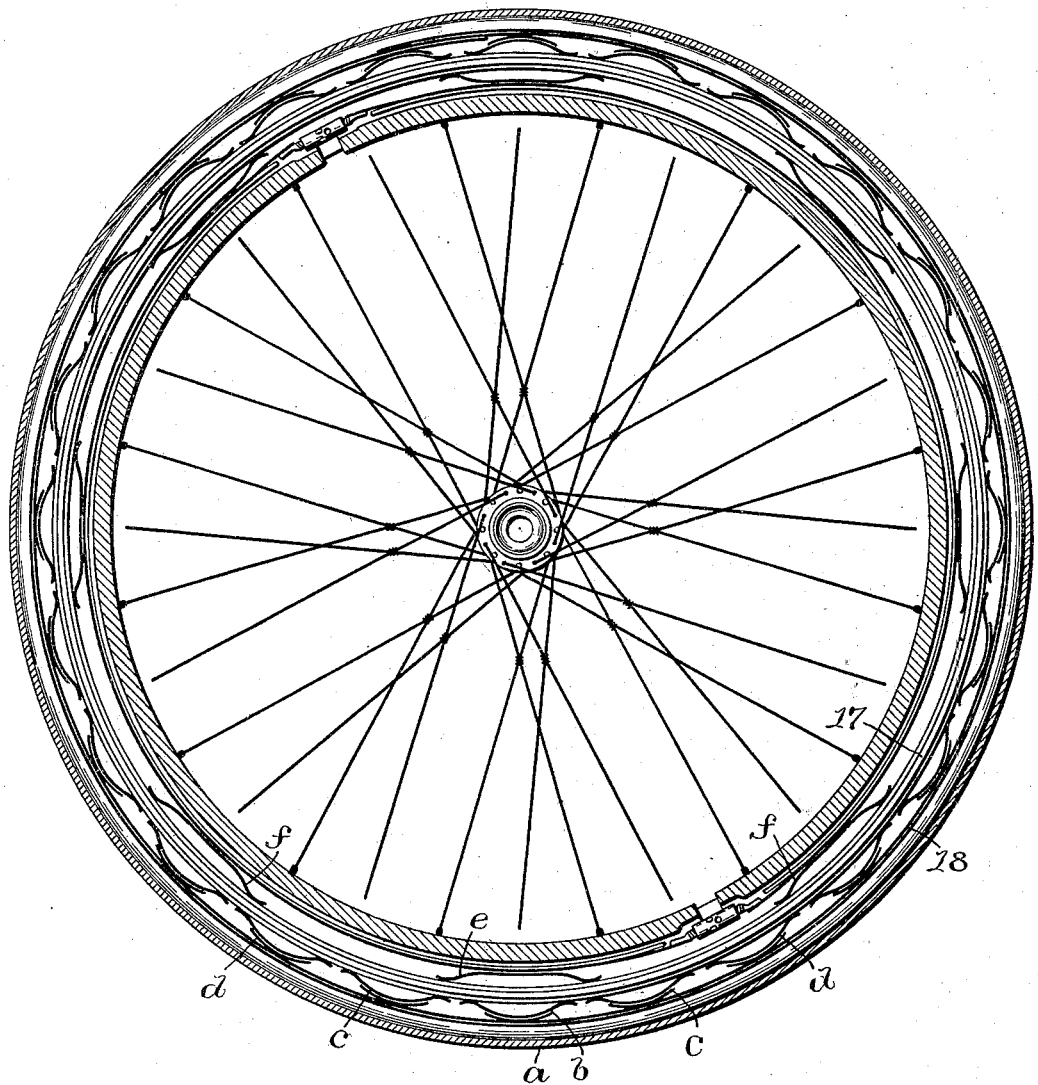

No. 627,223. Patented June 20, 1899.
W. CORLISS.
WHEEL TIRE.
(Application filed Apr. 13, 1898.)
(No Model.) 2 Sheets—Sheet 1.

WITNESSES: INVENTOR:
Chas. H. Luther Jr. William Corliss
B. M. Simms By Joseph A. Miller & Co.
Attys No. 627,223. Patented June 20, 1899.
W. CORLISS.
WHEEL TIRE.
(Application filed Apr. 13, 1898.)
(No Model.) 2 Sheets—Sheet 2.
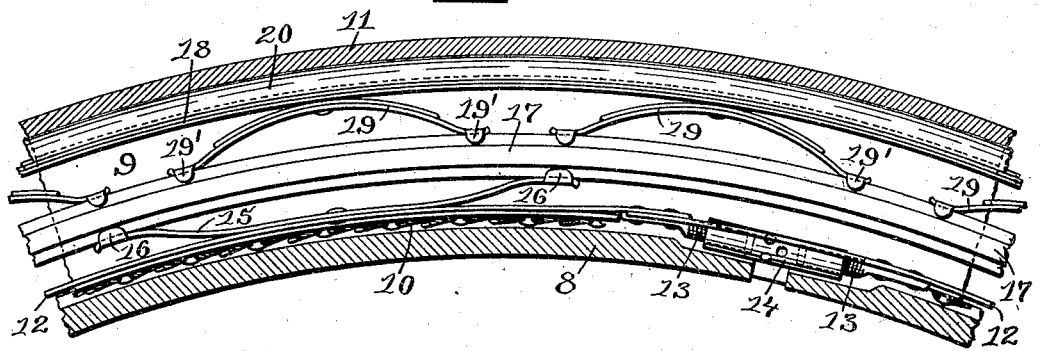
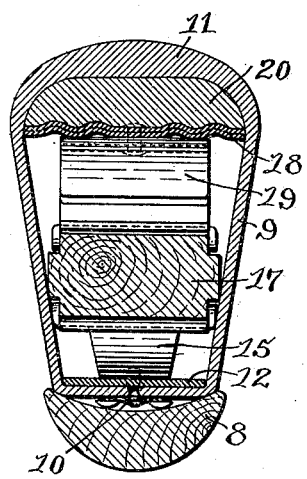
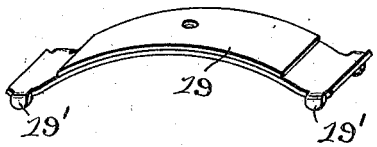
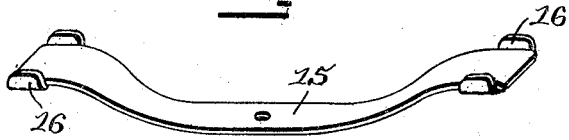
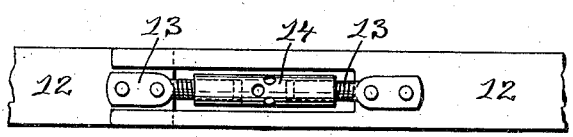
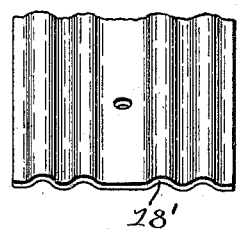
WITNESSES:
Chas. H. Luther Jr
B. M. Simms
INVENTOR:
William Corliss
by Joseph A. Miller & Co.
Attys.

UNITED STATES PATENT OFFICE.

WILLIAM CORLISS, OF PROVIDENCE, RHODE ISLAND.

WHEEL-TIRE.

SPECIFICATION forming part of Letters Patent No. 627,223, dated June 20, 1899.

Application filed April 13, 1898. Serial No. 677,439. (No model.)

*To all whom it may concern:*

Be it known that I, WILLIAM CORLISS, of the city and county of Providence, in the State of Rhode Island, have invented a new and useful Improvement in Wheel-Tires; and I hereby declare that the following is a full, clear, and exact description of the same, reference being had to the accompanying drawings, forming part of this specification.

This invention has reference to an improvement in tires for bicycle and other wheels; and it consists in the peculiar and novel construction whereby a supplemental wheel-rim of larger diameter than the rim connected by the spokes with the hub of the wheel supports a series of springs interposed between the supplemental wheel-rim and the tread of the tire and the wheel is suspended from the supplemental rim by the cover of the tire, as will be more fully set forth hereinafter.

In spring-wheel tires as heretofore constructed the weight has been supported on the springs between the wheel-rim and the tread of the tire in contact with the ground, so that each succeeding spring or springs carried the load. This construction requires springs of sufficient strength to support the load. Tires constructed on this principle were found in practice either too heavy or liable to yield to the load so much that the tread of the tire ceased to be a true circle and formed a flattened section when in contact with the ground.

One object of this invention is to construct a spring-wheel in which the tread of the tire is supported by a supplemental rim disconnected from the wheel-rim and the tire will retain its circular form under a normal load.

Another object of the invention is to construct a wheel so that practically all the springs in the tire act to support the load.

Figure 1 is a vertical sectional view of a bicycle-wheel provided with my improved tire. Fig. 2 is an enlarged sectional view of part of the tire. Fig. 3 is a transverse sectional view of the tire. Fig. 4 is a perspective view of one of the outer series of springs. Fig. 5 is a perspective view of one of the inner series of springs. Fig. 6 is a view of part of the binder-strap, and Fig. 7 is a perspective view of part of the corrugated strip out of which the tread-ring is formed.

Similar marks of reference indicate corresponding parts in all the figures.

In the drawings, 8 indicates the rim of the wheel; 9, a cover of non-elastic flexible textile material, the edges of which are secured together by the lacing 10. The central portion forming the tread 11 is preferably made thicker than the sides and may be covered with rubber.

12, is a binder-strap provided with one or more take-up devices, consisting of two screw-bolts 13 13, secured to the ends of the strap 12, threaded one with a right and one with a left hand threaded sleeve 14, by which the screw-bolts may be drawn together to contract the length of the binder-strap and secure the cover 9 to the wheel-rim. A series of springs 15 are secured to the binder-straps at their center by means of a rivet, and their ends are provided with the lugs 16. The ends of the springs 15 bear on the rim 17, preferably made of wood bent to form a rigid supplemental rim, on which the tire is supported and within which the wheel is suspended.

Concentric with the rim 8 and the rim 17 is the tread-ring 18, which is made of a continuous strip of preferably corrugated steel 18', (shown in Fig. 7,) so as to form two or more thicknesses. To this tread-ring 18 are riveted the springs 19 19, the rivets extending through the two or more thicknesses of the strips 18', so as to secure the same together at intervals to prevent longitudinal motion between the strips and secure a substantial circular ring. To the tread-ring 18 are secured the series of springs 19 19. (Shown in Fig. 4.) These springs are formed of two or more layers of spring-steel. The ends of the longest plate are provided with the lugs 19', by which the springs are held in the proper relation with the annular rim 17. Between the cover 9 and the tread-ring 18 is placed the bolster 20, preferably formed in a continuous ring. It may be made of wood or, if desired, of rubber or other suitable material.

In a wheel provided with a tire constructed as herein shown and described the tread of the tire retains its circular form, yielding only slightly to small irregularities of the road-surface. The rim of the wheel is secured by the flexible cover 9 to the tread of the tire, so that the wheel and its load are suspended from the tire, and practically all the springs coöperate in supporting the load. To illustrate this peculiar operation of the wheel, it will be seen on reference to Fig. 1 that if the wheel, with its load, bears on the road at the point $a$ the spring $b$ apparently supports the whole load; but as the spring $b$ is one of the series of springs 19, secured to the practically rigid tread-ring 18 and bearing on the rigid annular rim 17, the tread-ring transmits the pressure onto the springs $c$ $c$ and $d$ $d$, and the annular rim 17 transmits the pressure to the springs $e$ and $f f$, while the cover 9 transfers the weight of the load and the wheel to the upper series of the springs 19 and 15, so that practically all the springs coact in supporting the load. The supplemental annular rim 17, inflexible and practically rigid, forms the support of the wheel and its load, the wheel-rim 8 being suspended within the annular rim 17 by the cover of the tire. The springs 19, placed between the tread-ring 18 and the annular rim 17, cushion the tread of the tire and act to maintain the tread-ring concentric with the annular rim, and the springs 15, interposed between the wheel-rim 8 and the annular rim 17, act to maintain the two rims concentric. The tread-ring of the tire, the annular rim, and the wheel-rim may be considered as free to move bodily and independent of each other, restricted in their movement by the inelastic cover inclosing the three rims or rings and yieldingly resisted by the interposed springs.

As the cover incloses the tread-ring, the annular rim, and the springs 19 19 and holds them normally concentric with the wheel-rim, to which the cover is secured, a practical tire may be made without the use of the springs 15. By this construction I am able to produce a tire that will ride as easily as the pneumatic tire, that will yield to small obstacles without lifting, will retain its circular form better than the pneumatic, and for these reasons will propel easier, be more durable, and cannot be disabled by punctures. Hence it is adapted to use on carriages and other vehicles where the pneumatic tire has been found to be impractical.

Having thus described my invention, I claim as new and desire to secure by Letters Patent—

1. In a wheel, the combination with the wheel-rim, a tread-ring supporting the tread of the tire, and a flexible, non-elastic cover extending over the tread-ring and secured to the wheel-rim, of a bent-wood annular rim intermediate the wheel-rim and the tread-ring, and springs between the bent-wood annular rim and the tread-ring; whereby the wheel and its load are suspended from the tread-ring by the flexible cover and supported from above on the bent-wood annular rim free to move independent of the wheel-rim, as described.

2. In a wheel-tire, the combination with the wheel-rim 8 and the flexible cover 9 secured to the wheel-rim, of the tread-ring 18 formed of a strip of corrugated metal, the annular rim 17, the series of springs 19 secured to the tread-ring and bearing on the annular rim, the binder-strap 12, a contracting device on the binder-strap, and the series of springs 15 secured to the binder-strap and bearing on the annular rim; whereby the wheel is supported on a cushioned tread, as described.

3. In a wheel-tire, the combination with a tread-ring formed of a continuous strip of corrugated spring-steel placed spirally to form two or more thicknesses and secured together at intervals, of an external cover secured to the rim of the wheel, and a yielding cushion interposed between the wheel-rim and the tread-ring; whereby the tread of the tire is supported and maintained in the circular form, as described.

4. In a wheel-tire, the combination with the tread-ring 18 consisting of two or more thicknesses, of a continuous strip of corrugated spring-steel secured together at intervals, of the cover 9, the binder-strap 12, and springs secured to the binder-strap; whereby the tread of the tire is maintained normally concentric with the rim of the wheel, as described.

5. In a wheel-tire, the combination with the tread-ring 18, the bolster 20, and the cover 9 secured together by the lacing 10, of the binder-strap 12, the contracting device for the binder-strap, the series of springs 19 secured to the tread-ring, the series of springs 15 secured to the binder-strap, lugs on the ends of the springs, and the annular rim 17; whereby the tire may be secured to the wheel-rim, the tread of the tire supported by the springs in the normally concentric position with the wheel-rim, and the load supported by practically all the springs, as described.

In witness whereof I have hereunto set my hand.

WILLIAM CORLISS.

Witnesses:
B. M. SIMMS,
J. A. MILLER, Jr.